United States Patent [19]

Wisecarver

[11] Patent Number: 4,781,499
[45] Date of Patent: * Nov. 1, 1988

[54] LATCH ASSEMBLY FOR A CARGO BRACING DEVICE

[75] Inventor: Warren R. Wisecarver, Walnut Creek, Calif.

[73] Assignee: Bishop-Wisecarver Corporation, Pittsburg, Calif.

[*] Notice: The portion of the term of this patent subsequent to Jun. 2, 2002 has been disclaimed.

[21] Appl. No.: 54,015

[22] Filed: May 26, 1987

Related U.S. Application Data

[63] Continuation-in-part of Ser. No. 666,094, Oct. 29, 1984, Pat. No. 4,669,934.

[51] Int. Cl.$^4$ .............................................. B60P 7/06
[52] U.S. Cl. ..................................... 410/151; 410/145
[58] Field of Search ....................... 410/143, 145, 151

[56] References Cited

U.S. PATENT DOCUMENTS

| | | |
|---|---|---|
| 2,411,768 | 11/1946 | Welch . |
| 2,482,959 | 9/1949 | Anderson et al. . |
| 2,538,385 | 1/1951 | Schurman . |
| 2,637,576 | 5/1953 | Nottingham . |
| 2,830,843 | 4/1958 | Seaburg et al. . |
| 3,049,328 | 8/1962 | Bishop . |
| 3,674,329 | 7/1972 | Schill . |
| 4,014,572 | 3/1977 | Binns ................................ 292/108 |
| 4,669,934 | 6/1987 | Wisecarver . |

Primary Examiner—Gerald A. Michalsky
Attorney, Agent, or Firm—Flehr, Hohbach, Test, Albritton & Herbert

[57] ABSTRACT

Disclosed is a latch assembly for a cargo bar of the type having at least two relatively displaceable members. A pivotally mounted handle is used to extend the members in opposite directions to engage in compression the opposite walls of a cargo container. The latch assembly includes a housing having a latch element which is pivotally mounted by a pivot pin to the housing. The latch element is spring biased toward a latched position at which the latch element is in latching engagement with the handle of the extending means. The pivotal mount for the latch element is provided with clearance to enable displacement of the latch element relative to the pivot pin, and the housing is formed with a cap portion positioned proximate the latch for area-to-area support of the top of the latch element upon displacement of the latch relative to the pivot pin. The latch assembly also includes a ramp formed toward the base of the latch element to provide a method for easy release of the latch element. A protrusion and a mating recess are provided on the latch and handle, respectively, to prevent dynamic unlatching of the latch.

6 Claims, 2 Drawing Sheets

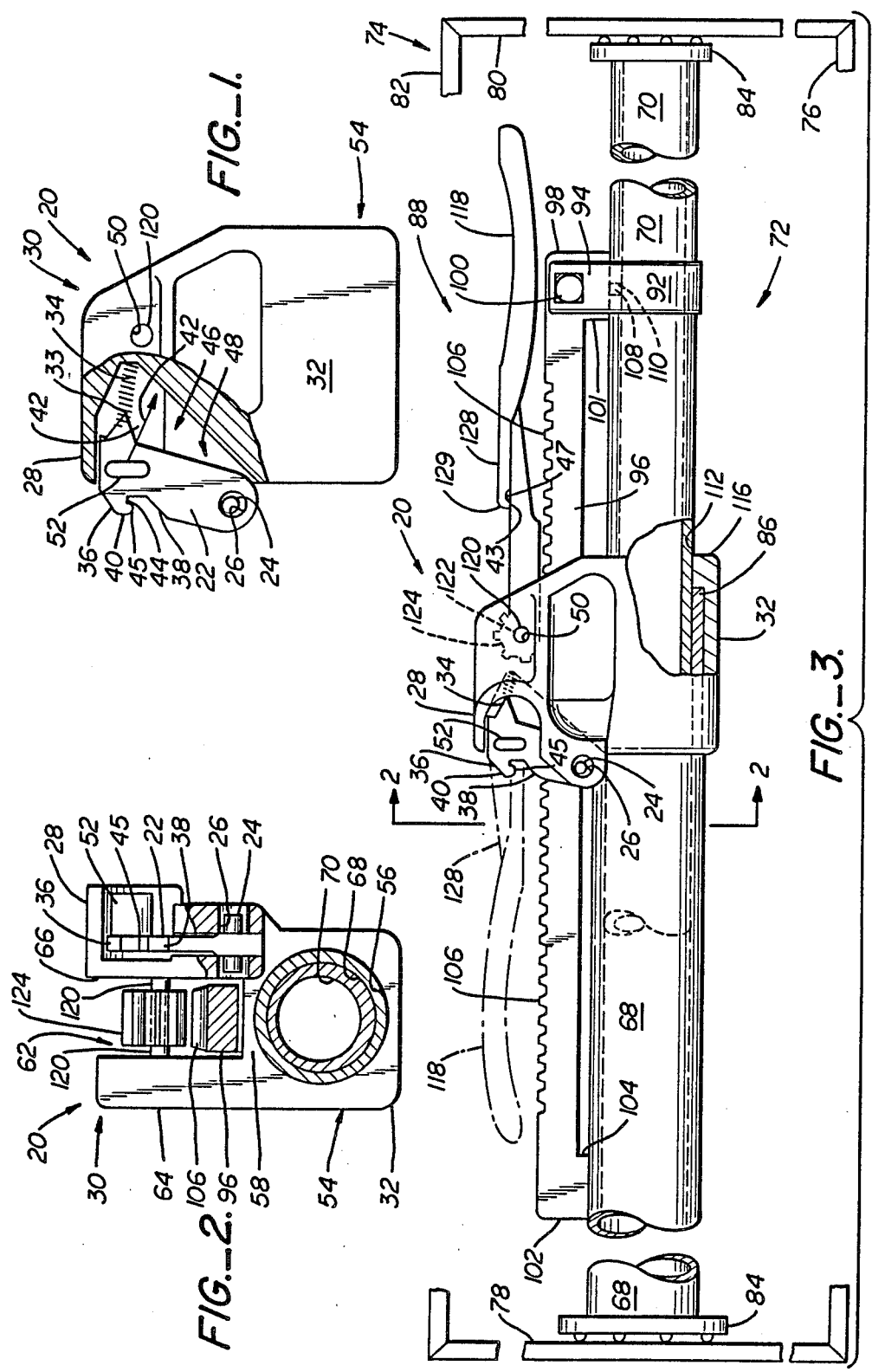

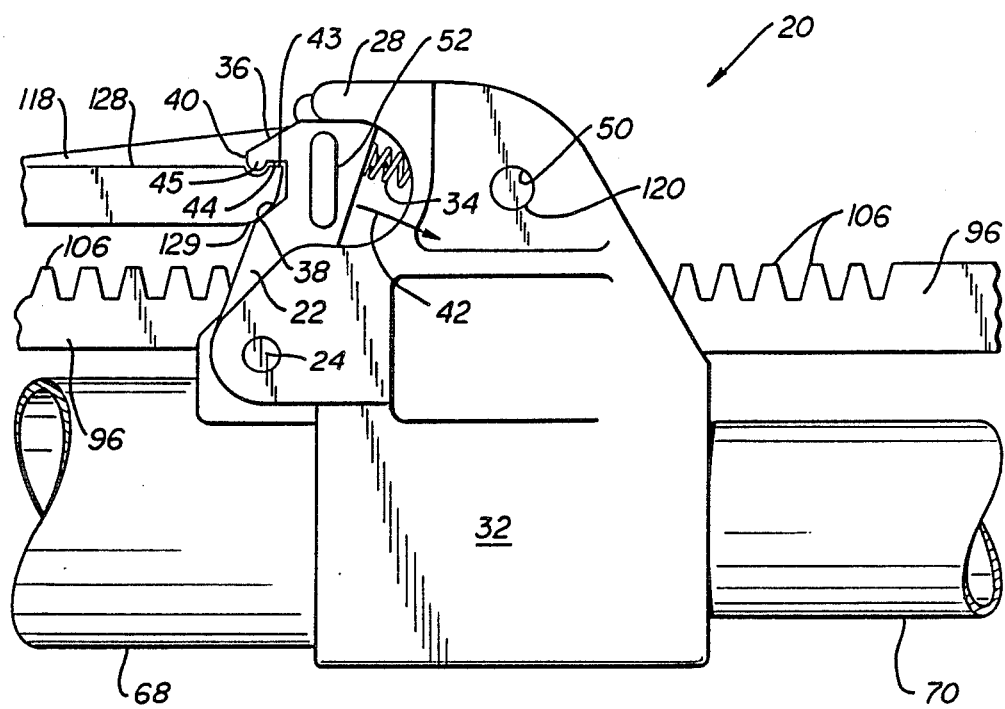
FIG._4.
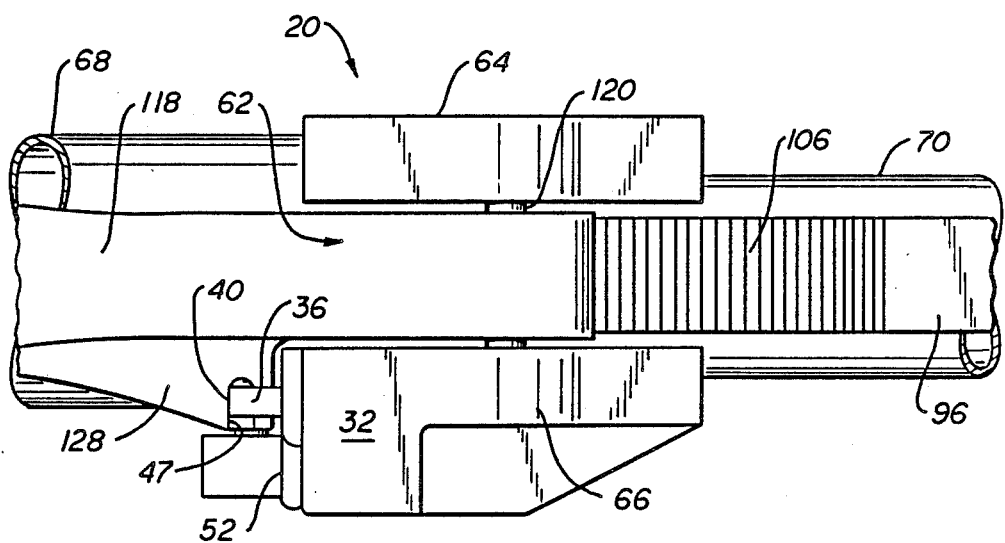
FIG._5.

LATCH ASSEMBLY FOR A CARGO BRACING DEVICE

RELATED APPLICATION

This application is a continuation-in-part application based upon application Ser. No. 666,094, filed Oct. 29, 1984, now U.S. Pat. No. 4,699,934, and entitled "An Improved Latching Assembly and Method for a Cargo Bracing Device."

BACKGROUND OF THE INVENTION

The field of this invention relates generally to latching assemblies, and more particularly, to latching assemblies for cargo bracing devices used in cargo carrying vehicles.

Latching assemblies for extensible cargo bracing bars are well known. For example, U.S. Pat. No. 2,411,768 to Welch discloses a boxcar brace having a locking tip on a pivoted handle that engages a latch provided to secure the handle and the extended bracing members in place. Another example of a cargo bar latch assembly is that of U.S. Pat. No. 3,049,328 to Bishop. Two laterally displaceable members are telescoped to move in opposite directions when a handle is pivoted. The handle is held in place by a spring biased latch, and once the handle moves past the latch, the latch pops out into a latched position behind the handle.

Latch assemblies also can be found in a wide range of devices which include doors or windows that are latched closed. Typical of such assemblies are the latches disclosed in U.S. Pat. Nos. 3,674,329, 2,830,843, 2,637,576, 2,538,385 and 2,482,959. Such prior art latch assemblies, however, are not subjected to the same environmental stress as are cargo bar latches. More particularly, the uses to which such latches are put do not include high loading forces, stress reversals and extreme vibration.

In order to secure cargo in a trailer or rail car, a cargo bracing device must be capable of generating and maintaining substantial axial forces along the bar. Thus, the latch assembly experiences a considerable load in order to frictionally secure the bar between opposite walls of the transport container. The walls of the truck-trailer or the rail car, however, are not rigid. They flex under the dynamics of transport. In addition to the substantial load, therefore, there will be stress reversals in which the flexure of opposed wall will momentarily substantially unload the bar and then rapidly load the same.

Such stress reversals produced by wall flexure may combine with the dynamic vibrations which are constantly present in the transport container to cause unlatching of the cargo bar latch assembly. Once the bar is unlatched, it will drop to the floor of the container and be useless in bracing the load.

SUMMARY OF THE INVENTION

A. Objects

Accordingly, it is an object of the present invention to provide a latch assembly for a cargo bracing device which is capable of withstanding high loads and will not release under dynamic loading including stress reversals and high vibration.

Another object of the present invention is to provide a latch assembly for a cargo bracing device which is easy to operate and yet is positively latched against premature release.

Still a further object of the present invention is to provide a cargo bar latch assembly which is durable, inexpensive to construct, and employs a minimum of components.

The latch assembly of the present invention has other objects and features of advantage which will be apparent from or are set forth in more detail in the following description of the preferred embodiment and the accompanying drawing.

B. Summary

The latch assembly of the present invention is employed on a cargo bracing device having two relatively displaceable members and an extension assembly coupled to said members for displacement thereof. The extension assembly includes a rack and pinion drive assembly, a manually manipulatable handle coupled through the drive assembly to displace the members into opposing wall of a cargo container, and a latch assembly mounted to engage and latch the handle in a latched position against displacement. The improvement in the latch assembly comprises, briefly, the latch assembly and handle including interengaging surfaces oriented to extend in a direction transverse to the direction of movement of the latch during unlatching to prevent the latch assembly from unlatching during dynamic loading and vibration of the cargo bracing device. In the preferred form oppositely facing shoulders on the latch element and handle are formed with a mating recess and protrusion. The recess and protrusion have sufficient depth that the protrusion cannot move completely out of the recess without displacing the latch element against its biasing spring.

BRIEF DESCRIPTION OF THE DRAWINGS

FIG. 1 is a partial broken away side elevation view according to an embodiment of the invention;

FIG. 2 is an end view, partially broken away, of the latch assembly of FIG. 1;

FIG. 3 is a partially broken away side elevation view of the FIG. 1 embodiment adapted for use on one particular type of cargo bracing bar.

FIG. 4 is an enlarged, fragmentary side elevation view corresponding to FIG. 3 and showing the handle in a latched position.

FIG. 5 is a top plan view corresponding to FIG. 4.

DETAILED DESCRIPTION OF A PREFERRED EMBODIMENT

Described below and shown in the drawing is a specific preferred embodiment of that which the inventor considers at present to be the best mode of fabrication, assembly and operation for carrying out the invention.

Latch assembly 20 includes a movable latch element 22 which is pivotally mounted by inserting a generally cylindrical pin 24 through a circular hole 26 provided toward the bottom of latch 22. The upper end of latch 22 is positioned below a laterally extending flange or a cap portion 28 provided toward a top 30 of a housing 32. The difference in diameter between pin 24 and hole 26 and the spacing between latch 22 and cap 28 is sufficient to permit area-to-area contact of the top of latch 22 with cap 28, when the latch is in tension. Such contact distributes the loading over a sufficient area of cap 28 to avoid stress concentrations under the high loading forces, which stress concentrations would fatigue the cap. Latch 22 is spring-loaded through latch protrusion 33 by a spring 34 to bias latch 22 toward the latched position shown in the drawing.

To engage and latch handle 118 (described below) in a latched position, an upper or first ramp 36 and a lower or second ramp 38 are provided on a front edge of latch element 22. Ramps 36 and 38 slope in the same direction. Upper ramp 36, at its lower end, terminates in a handle-locking pointed tip 40, and below tip 40 a protrusion 45 and a substantially horizontal shelf or shoulder 44 are provided.

Within housing 32, latch 22 is positioned in a chamber 46. Latch 22 is spaced apart from housing 32 by a gap 48 which permits clearance for movement of the latch element to an unlatched position, as indicated by arrow 42.

In use, a portion 128 on handle 118 engages ramp 36 during a latching mode. As handle portion 128 moves down, the accurate end 129 slides along ramp 36 toward tip 40 and latch 22 is pivoted clockwise. When handle end 129 passes tip 40, latch 22 snaps back in a counter-clockwise direction, so handle portion 128 is caught by and rests against shoulder 44 in a closed latched mode. Handle portion 128, by exerting an upward force on shoulder 44, urges latch 22 upward. Since pin 24 fits loosely or has clearance with respect to bore 26, the top of latch element 22 moves into contact with load bearing cap portion 28. Cap 28, therefore, carries a substantial portion of the upward force which would otherwise be carried by pin 24.

To easily disengage the handle from latch 22, the handle is urged further downward in the counter-clockwise direction to cause handle end 129 to encounter lower or second ramp 38. As the handle protrusion moves down, it slides along lower ramp 38 and latch 22 is driven in a clockwise direction to break free any corrosion or ice. Thus loosened latch 22 can be urged further in a clockwise direction by engaging tab 52 on the latch element with a thumb or finger of the user, to move tip 40 far enough into housing 32 so the handle protrusion can be rotated upward and away from latch 22.

A hole 50 penetrates housing 32 toward top 30, and is designed to receive and hold a pin 120 and handle 118. Visible in FIG. 2 toward a bottom 54 of housing 32 is a bore 56, receiving cargo bracing bar members 68 and 70, as more fully described in connection with FIG. 3 below. Above bore 56, housing 32 is provided with a transversely extending housing portion 58 having an upper surface which serves as a floor of a slot 62. Slot 62 is defined by an upright member 64 which is parallel to an upright member 66, both of which are perpendicularly joined to housing portion 58.

Latch assembly 20 is mounted on a cargo bracing device 72 (FIG. 3) which is used to prevent cargo (not shown) from shifting within a container 74. Container 74 will typically include a floor 76 having a pair of parallel walls 78 and 80 rising vertically away from floor 76, to terminate in a roof 82 joined to the upper ends of walls 78, 80. Cargo bracing bar assembly 7 is frictionally secured in position by compression against the interior surfaces of opposing walls, most typically walls 78 and 80, to thereby prevent shifting of cargo within the container. As will be appreciated, cargo bars also are used between floor 76 and roof 82.

Cargo bracing bar assembly 72 includes outer tube 68, into an end of which telescopes an inner tube 70. On the free end of each tube 68, 70 is secured a pad or foot 84 adapted to frictionally engage walls 78 and 80. An end 86 of outer tube 68 is secured to latch assembly housing 32 which also carries a handle assembly 88. Latch assembly 20 is used in combination with handle assembly 88 for final extension and latching of tubes 68 and 70 in compression between walls 78 and 80, for securely bracing cargo.

In order to achieve relative displacement between tubular elements 68 and 70, a collar 92 is secured on inner tube 70. Collar 92 is spaced between the ends of inner tube 70 to leave sufficient length for telescoping of tube 70 into outer tube 68. From the top of collar 92 extend parallel ears 94. A rack element 96 has one end 98 secured between ears 94 by attaching means such as a bolt 100. Bolt 100 and a downwardly depending leg 101 from rack element 96 are formed so as to position rack 96 from the outside surface of inner tube 70 so that outer tube 68 can telescope between the rack and inner tube.

A free end 102 of rack 96 has a spacer leg or projection 104 which rests on and slides over the outside surface of outer tube 68. On the upper or outer face of rack 96 are a plurality of transverse, flat teeth 106. The foot 101 of secured end 98 of rack 96 is provided with a stud 108 projecting into a hole 110 provided in inner tube 70 for anchoring rack 96 and collar 92.

Onto end 86 of outer tube 68 is fixedly mounted housing 32 having an inwardly extending lip 116 defining a bore 112 dimensioned for receipt of inner tubular member 70. The inner periphery of lip 112 slidably receives inner tube 70 to aid in its aligning.

Handle assembly 88 includes a handle 118, mounted between upright members 64 and 66 by a pin 120. Pin 120 also penetrates a bore provided in a hub 122 of the handle to pivotally secure handle 118 in place between housing uprights 64 and 66. On the periphery of hub 122 are a plurality of gear teeth 124 for engaging teeth 106 of rack 96. Gear teeth 124 are arranged over an arc of such length that when handle 118 is pivoted about 180 degrees clockwise from the locking position (shown in phantom in FIG. 3) to the open position (shown in solid in FIG. 3), then all teeth 124 are disengaged from rack 96 to permit unobstructed sliding of rack 96 between upright members 64 and 66 for the major adjustment of telescoping inner tube 70.

At the inner end of handle 118 away from the portion which is gripped by the user is laterally projecting locking or latching portion 128. Handle portion 128 is so spaced from hub 122 that when handle 118 is swung from its open unlatched position in a counter-clockwise direction to the closed latched position shown in phantom, portion 128 projects laterally outwardly to slot 62 toward the front of upright member 66. The end 129 of portion 128 is preferably sloped or accurate as shown to facilitate engagement with upper or first ramp 36 of spring-loaded latch 22. The cargo bar extension structure shown in the drawing, therefore, is substantially as described in more detail in U.S. Pat. No. 3,049,328.

In operation, the FIG. 3 cargo bracing bar assembly 72 is placed between opposite walls 78, 80 of container 74, generally in the position shown in FIG. 3, initially with handle 118 in its open position.

Handle 118 has three primary positions which are:

(1) a resting open position as shown in solid lines FIG. 3, wherein handle 118 is released and tubes 68 and 70 are disengaged from walls 78, 80;

(2) a latched or closed position, shown in ghost in FIG. 3 and solid lines in FIGS. 4 and 5, wherein handle 118 has been pivoted counter-clockwise 180 degrees to the position shown in phantom, with a shoulder 43 on handle portion 128 engaging shoulder 44 of latch 22 so handle 118 is locked into position with tubes 68 and 70 rigidly in compression against walls 78, 80; and (3) a releasing or dynamic unlatching position, wherein handle 118 is initially in the latched position, and then is grasped and moved further counter-clockwise so protrusion 128 engages and slides against second or lower ramp 38, thus urging latch 22 in a clockwise direction to break free any ice or corrosion and pivot the latch forward slightly.

Initially, handle 118 is in the open position, to permit manual extension of telescoping inner tube 70 to bring pads 84 into contact with truck walls 78, 80. Then handle 118 is grasped and turned counter-clockwise into the phantom line position shown in FIG. 3 and the solid line position of FIGS. 4 and 5. During this movement, gear teeth 124 engage rack teeth 106 to exert a spreading force through rack 96 to collar 92 and hence to tube 70, to thereby extend tubes 68, 70 in opposite directions for the final tightening of bracing bar 72. This compresses pads 84 against the opposed walls.

As handle 118 is pivoted into the latching mode, the curved lower end 129 of protrusion 128 engages upper ramp 36 of latch 42. This causes latch 22 to pivot clockwise into chamber 46 against spring 34. After handle portion 128 passes tip 40, latch 22 is snapped back by spring 34 into the latching position, so the handle of the bracing bar is latched firmly in position to thereby maintain the axial force between members 68 and 70 and secure the bar bracing position between walls 78, 80.

Second or lower ramp 38 is provided on latch 22 to facilitate disengaging latch 22. This arrangement is particularly useful when latch assembly 20 is used in an environment such as the interior of a refrigerator truck where freezing of water and corrosion due to chemicals can make it quite difficult to pivot latch 22 about pin 24. Ice or debris can gather in gap 48 between latch element 22 and housing 32 and corrosion and/or ice can form around pivot pin 24 to "freeze" latch 22 in place.

By urging handle 118 downwardly away from latch shoulder 44 handle portion end 129 engages lower ramp 38. The force exerted by the lever arm length of handle 118 enables a great deal of force to be applied against lower ramp 38 and hence to latch element 22. Gradually increasing force can be applied to handle 118 until latch 22 breaks free, at which time a user's thumb can engage flange 52 on the latch element to further push latch 22 in a clockwise direction, thus freeing handle 118 to be rotated in a opposite direction to the open resting position.

When in the closed latched position, handle portion 128 exerts a large upward force against shoulder 44 of latch 22, which normally would be transferred to pin 24. To avoid excessive loading on pin 24, housing 32 is provided with a transverse flange or cap portion 28 which extends over the top of latch 22. Additionally, hole 26 within latch 22 has a diameter enough larger than that of pin 24 to permit upward movement of latch 22 so the entire upper surface of latch 22 can engage cap portion 28 when handle 118 is in the latched position. Thus, a substantial portion of the force exerted on latch 22 by handle 118 is transferred to cap portion 28, which can much more easily carry the high forces encountered. This has the advantage of permitting use of a small diameter pin 24, so pin 24 can have a much smaller cross-sectional area for use in cramped quarters having tight tolerances.

As will be appreciated, release of the latch by driving the handle down against the ramp also will displace latch element 22 slightly in a linear manner about pin 24 as well as rotating the latch about the pin. It should be noted that it is relatively easy to apply a downward force to handle 118 to effect release by gripping tubular member 68 and the handle and squeezing.

Under dynamic transport conditions cargo bracing devices are subjected to considerable vibration. Moreover, the opposite container walls 78 and 80 or 76 and 82 typically flex toward and away from each other. Thus, the load on the cargo bar is variously substantially increased, as the walls flex toward each other and substantially decreased, as the walls flex apart. While the pinion and rack drive assembly 122, 96 places an initially compressive load on the bar, which also tends to bow the opposed walls outwardly, under some conditions additional flexing will be sufficient to instantaneously substantially unload the bar.

This rapid loading and unloading of bracing device 72 as a result of wall flexure can combine with transverse vibrational loading to occasionally release latch assembly 20 under some transport operating conditions. This has been found to occur when the latch assembly is formed with opposed interengaged shoulders 43 and 44 that are smooth, flat surfaces, as shown in the above referenced parent application. Thus, if inwardly facing shoulder 44 on the latch element 22 extends outwardly to tip 40, and oppositely facing shoulder 43 is similarly formed, dynamic unlatching of the latch assembly has occasionally occurred. The wall flexure apparently combines transverse vibration to cause the handle shoulder 43 to move the latch sufficiently to unlatch the assembly.

In order to prevent dynamic unlatch, cargo bracing device 72 is formed with an improved latch assembly in which shoulder 44 is provided with an inward protrusion 45 which is received in a recess 47 in handle portion 128. Thus, protrusion 45 and recess 47 provide interengaged surfaces on the sides thereof which are oriented to extend in a direction transverse to the direction (indicated by arrow 42) of movement latch 22 during unlatching of the latch assembly.

Stated in an alternative manner, protrusion 45 has an inner side which extends radially toward pivot pin 24. If the cargo bar undergoes a stress reversal which would cause the handle to move downwardly away from latch element 22 (as is shown in FIG. 4), the bottom end 129 of handle portion 128 will engage ramp 38 before protrusion 45 can completely move out of recess 47. In order for the protrusion 45 to leave recess 47, latch element 22 must be moved in the direction of arrow 42 against biasing spring 34.

The mating protrusion and recess in opposing shoulders 43 and 44 insures that the shoulder 43 on handle portion 128 will not slip or be vibrated past the opposing shoulder 44 on the latch. This is accomplished without increasing the difficulty of manually opening or unlatching the latch when desired.

When the load on the bar increases the protrusion prevents lateral vibration from urging the latch element to the open position. When the load is reduced to substantially zero, protrusion 45 cannot escape recess 47 without compressing spring 34. Even if the protrusion should move out of recess 47, spring 34 then forces the protrusion back into recess 47 as the loading reverses before the handle recess can pass beyond the latch protrusion.

As will be appreciated, the protrusion can be provided in handle portion 128 and the recess in latch 22, and the latch assembly will operate in substantially the same manner to prevent dynamic unlatching. The notch in latch 22 between shoulder 44 and ramp 38 is dimensioned to receive handle portion 128, and the depth of the recess and height of the protrusion are dimensioned to prevent complete withdrawal of the protrusion from the recess without first displacing the latch against the biasing spring. Thus, the combination of the protrusion and recess, as well as the shape of the latch, prevent dynamic unlatching.

While the above best mode provides a full and complete disclosure of a specific embodiment of the invention, it is noted that various modifications, alternate constructions, and equivalents can be employed without departing from the true spirit and scope of the invention. Therefore, the above example description and interrelated drawings shall not be construed as limiting the invention. The much broader scope of the invention is defined by the breadth of the appended claims.

What is claimed is:

1. A latch assembly for a cargo bracing device, said cargo bracing device having two relatively displaceable members, and an extension assembly coupled to said members for displacement thereof, said extension assembly including a drive assembly, a manually manipulatable handle coupled through said drive assembly to displace said members into engagement with opposing walls of a cargo container, and said latch assembly latching said handle in a latched position against displacement under the compression forces produced by said extension assembly to thereby retain said members in relatively fixed relation, wherein the improvement in said latch assembly comprises:

said latch assembly and said handle include interengaged surfaces oriented to extend in a direction transverse to the direction of movement of said latch assembly during unlatching to prevent unlatching of said latch assembly during dynamic loading and vibration of said cargo bracing bar.

2. The latch assembly as defined in claim 1 wherein, said latch assembly includes a latch element mounted for pivotal movement about a pivotal axis; and
said surfaces are oriented to extend in a radial direction relative to said pivotal axis.

3. The latch assembly as defined in claim 2 wherein, said latch element includes a shoulder positioned in a tangential orientation to engage an oppositely facing shoulder on said handle; and
said surfaces are provided by a protrusion on one of said shoulder and said oppositely facing shoulder and a mating recess on the other of said shoulder and oppositely facing shoulder, said protrusion and recess providing radially extending surface preventing unlatching.

4. The latch assembly as defined in claim 3 wherein, said protrusion is provided on said shoulder on said latch element; and
said recess is provided on said oppositely facing shoulder on said handle.

5. The latch assembly as defined in claim 3 wherein, said latch assembly is biased to a latched position by spring biasing means; and
said recess has a depth, said protrusion has a height, and said latch element has a shape preventing complete relative movement of said protrusion out of said recess prior to movement of said handle into engagement with said latch element in a direction opposed said spring biasing means.

6. The latch assembly as defined in claim 1 wherein, said latch element is mounted for pivotal movement and is spring biased for movement in a direction latching said handle, said latch element includes a notch therein dimensioned to receive a portion of said handle, said notch being defined by an inwardly facing shoulder oriented substantially tangentially with respect to pivotal movement of said latch element, and said inwardly facing shoulder having a radially extending protrusion proximate an outer end thereof; and
said handle includes a portion dimensioned to extend into said notch and having an outwardly facing surface formed to engage said inwardly facing surface, said outwardly engaging surface including a recess dimensioned to receive said protrusion therein, said handle being displaceable away from said inwardly facing shoulder to unlatch said handle, said handle engaging said latch element on a side of said notch opposite said inwardly facing surface prior to displacement of said protrusion completely out of said recess, and said latch element being mounted to require displacement thereof against said spring biasing means to enable movement of said portion of said handle out of said notch and unlatching of said latch assembly.

* * * * *